US012669413B2

(12) United States Patent
Feng et al.

(10) Patent No.: US 12,669,413 B2
(45) Date of Patent: Jun. 30, 2026

(54) POD PERFORMANCE TEST SYSTEM AND METHOD FOR NEAR SPACE AEROSTAT

(71) Applicant: Aerospace Information Research Institute, Chinese Academy of Sciences, Beijing (CN)

(72) Inventors: Hui Feng, Beijing (CN); Yanxiang Cui, Beijing (CN); Donghui Zhang, Beijing (CN); Wenliang Lin, Beijing (CN); Boen Li, Beijing (CN); Jin Zhou, Beijing (CN)

(73) Assignee: Aerospace Information Research Institute, Chinese Academy of Sciences, Beijing (CN)

( * ) Notice: Subject to any disclaimer, the term of this patent is extended or adjusted under 35 U.S.C. 154(b) by 262 days.

(21) Appl. No.: 18/677,791

(22) Filed: May 29, 2024

(65) Prior Publication Data

US 2024/0310251 A1 Sep. 19, 2024

Related U.S. Application Data

(63) Continuation of application No. PCT/CN2022/131040, filed on Nov. 10, 2022.

(30) Foreign Application Priority Data

Nov. 30, 2021 (CN) .......................... 202111442002.2

(51) Int. Cl.
G01M 99/00 (2011.01)
B64B 1/22 (2006.01)
G01W 1/08 (2006.01)

(52) U.S. Cl.
CPC ........ G01M 99/008 (2013.01); G01M 99/007 (2013.01); *B64B 1/22* (2013.01); *G01W 1/08* (2013.01)

(58) Field of Classification Search
CPC ... G01M 99/008; G01M 99/007; G01W 1/08; B64B 1/22
See application file for complete search history.

(56) References Cited

U.S. PATENT DOCUMENTS

2014/0124616 A1* 5/2014 Greco ........................ B64B 1/58
244/31
2022/0242566 A1* 8/2022 Phillips ..................... B64B 1/30

FOREIGN PATENT DOCUMENTS

CN 112729342 A * 4/2021 ........... G01C 25/005

* cited by examiner

*Primary Examiner* — Paul M. West
(74) *Attorney, Agent, or Firm* — Hemisphere Law, PLLC

(57) ABSTRACT

A pod performance test system for a near space aerostat includes: a HCI test control device, a motion simulation control device, a suspension device, and a motion simulation anti-twisting mechanism. The HCI test control device is electronically connected to the motion simulation control device, the motion simulation anti-twisting mechanism and a pod of the near space aerostat separately. The motion simulation control device is electronically connected to the motion simulation anti-twisting mechanism. The motion simulation anti-twisting mechanism is connected to the pod by a connector. The motion simulation control device controls the motion simulation anti-twisting mechanism to simulate various complex motion states according to a motion control parameter from the HCI test control device, and thus the pod is in the various complex motion states. When the pod is in the various complex motion states, performance test results of the pod under the various complex motion states can be obtained.

10 Claims, 6 Drawing Sheets

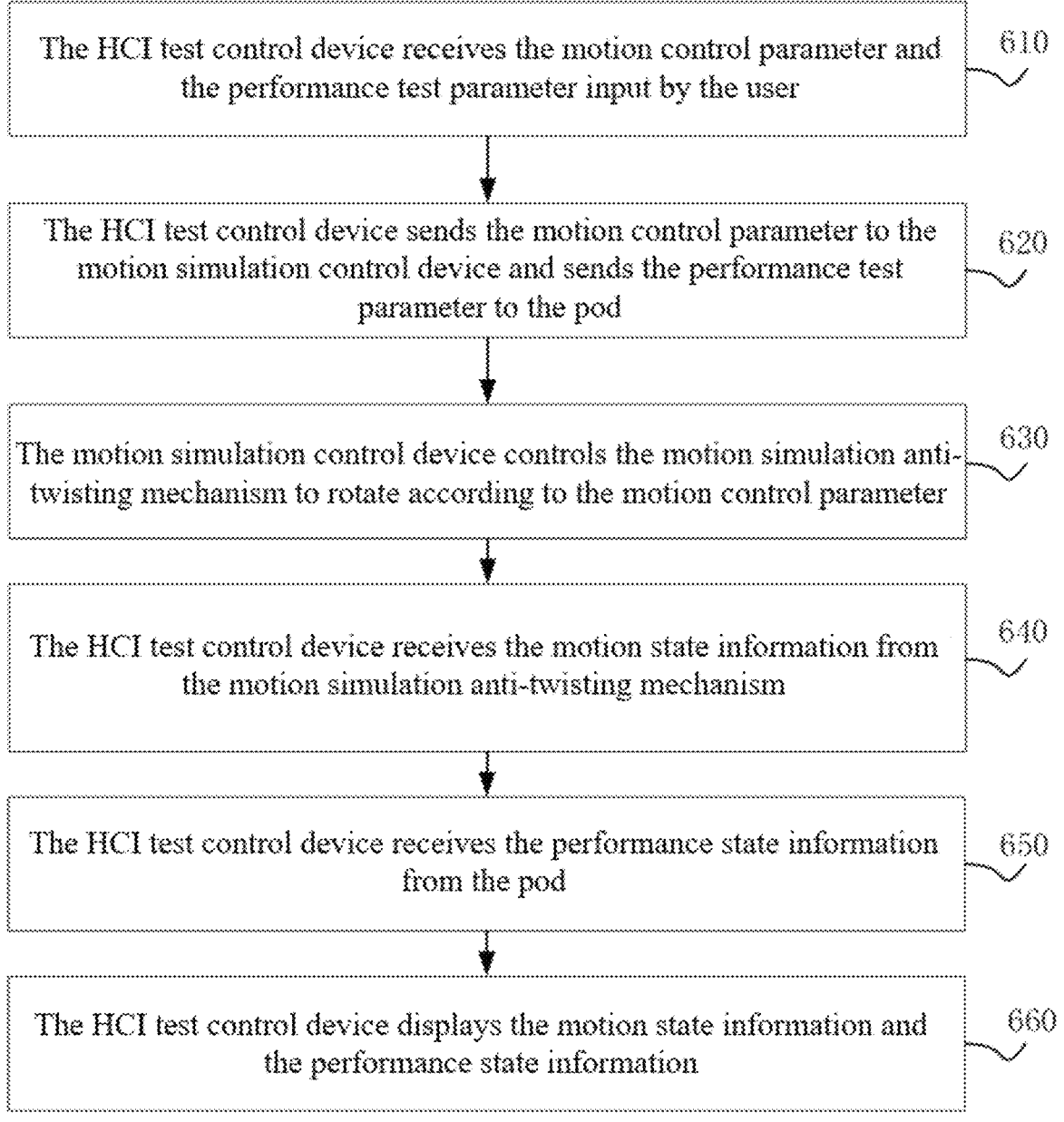

The HCI test control device receives the motion control parameter and the performance test parameter input by the user — 610

The HCI test control device sends the motion control parameter to the motion simulation control device and sends the performance test parameter to the pod — 620

The motion simulation control device controls the motion simulation anti-twisting mechanism to rotate according to the motion control parameter — 630

The HCI test control device receives the motion state information from the motion simulation anti-twisting mechanism — 640

The HCI test control device receives the performance state information from the pod — 650

The HCI test control device displays the motion state information and the performance state information — 660

FIG. 6

The motion simulation control device generates the motion control signal according to the motion control parameter ⟋710

The motion simulation control device sends the motion control signal to the motion simulation anti-twisting mechanism to control the motion simulation anti-twisting mechanism to rotate ⟋720

POD PERFORMANCE TEST SYSTEM AND METHOD FOR NEAR SPACE AEROSTAT

CROSS-REFERENCE TO RELATED APPLICATIONS

This application is a continuation of International Patent Application No. PCT/CN2022/131040, filed Nov. 10, 2022, which claims the priority of Chinese Patent Application No. 202111442002.2, filed Nov. 30, 2021, both of which are herein incorporated by reference in their entirety.

TECHNICAL FIELD

The disclosure relates to the field of near space technologies, and more particularly to a pod performance test system and method for a near space aerostat.

BACKGROUND

As one of space vehicles, high-altitude balloons have characteristics of high flight altitude, low cost, short preparation period, and easy and flexible implementation etc. After being carried in pods, the high-altitude balloons can carry out operations such as astronomical observation, atmospheric environment detection, relay communication, and navigation etc., playing a huge role.

In order to ensure normal operations of high-altitude balloons, a performance test for a pod is a necessary safety measure. In the related art, the pod is usually suspended on a suspension frame, and the performance test of the pod is carried out during a process of motion of the pod gradually approaches still from initial rotation, to obtain performance tests of the pod under different motion states.

However, in practical operations, the motion state of the pod is much more complex and cannot fully simulate actual motion, resulting in a limited performance test range for the pod.

SUMMARY

The disclosure provides a pod performance test system and method for a near space aerostat, used to solve problems of the limited performance test range of a pod in the related art, and to expand a performance test range of the pod.

In a first aspect, the disclosure provides the pod performance test system for the near space aerostat, including a human-computer interaction (HCI) test control device, a motion simulation control device, a suspension device, and a motion simulation anti-twisting mechanism.

The suspension device is configured to mount the motion simulation anti-twisting mechanism.

The HCI test control device is electronically connected to the motion simulation control device, the motion simulation anti-twisting mechanism and a pod of the near space aerostat separately, and the HCI test control device is configured to receive a motion control parameter input by a user, send the motion control parameter to the motion simulation control device, send a performance test parameter to the pod, receive motion state information from the motion simulation anti-twisting mechanism, receive performance state information from the pod, and display the motion state information and the performance state information.

The motion simulation control device is electronically connected to the motion simulation anti-twisting mechanism, configured to receive the motion control parameter from the HCI test control device, and to perform motion control to the motion simulation anti-twisting mechanism based on the motion control parameter.

The motion simulation anti-twisting mechanism is connected to the pod by a connector, configured to drive the pod to move under control of the motion simulation control device.

In an embodiment, the suspension device adopts a gantry structure, and the gantry structure includes three parts: a middle beam part, side beam parts and bottom supports, each of the side beam parts and the bottom supports is a trapezoid structure.

A bottom of the middle beam part defines at least one first through hole, configured to mount the motion simulation anti-twisting mechanism.

In an embodiment, the motion simulation anti-twisting mechanism includes a long shaft sleeve (i.e., a shaft sleeve), a flange support, a pin shaft, a bearing, a bearing base, a motor base, a servo motor, a box body, and eyebolts.

The flange support includes a top ring and a bottom ring, the top ring and the bottom ring together define a second through hole with an axis same as axes of the top ring and the bottom ring, a first end of the long shaft sleeve is disposed in the second through hole, the top ring defines multiple third through holes, the at least one first through hole is multiple, bolts pass through the multiple first through holes and the multiple third through holes to be matched with nuts, to fix the gantry structure to the flange support.

The pin shaft passes through the bottom ring and the long shaft sleeve.

An outside of a second end of the long shaft sleeve is sleeved with the bearing, an outside of the bearing is sleeved with the bearing base.

The second end of the long shaft sleeve is connected to the servo motor by screws.

The motor base is disposed at a lower end of the servo motor, an upper end of the motor base is connected to the bearing base by screws.

The box body is disposed outside the bearing base and the motor base, a lower end of the box body is fixed on the motor base by screws.

In an embodiment, the motion simulation control device includes a power supply, a power board, a transformer, a voltage regulator, an anti-twisting controller, a power interface, a first interface signal processing unit, and a second interface signal processing unit. The first interface signal processing unit includes a first interface, and the second interface signal processing unit includes a second interface.

The power supply is connected to the transformer and the power board separately, the transformer is connected sequentially to the voltage regulator and the power interface, the power board is connected to the anti-twisting controller, and the anti-twisting controller is connected to the first interface signal processing unit and the second interface signal processing unit separately.

The power interface is electronically connected to the motion simulation anti-twisting mechanism by a cable, configured to supply power to the motion simulation anti-twisting mechanism.

The first interface signal processing unit is electronically connected to the HCI test control device by a cable, configured to receive the motion control parameter, typically including an azimuth control angle and the angular velocity etc., from the HCI test control device.

The second interface signal processing unit is electronically connected to the motion simulation anti-twisting mechanism by a cable, configured to perform the motion control to the motion simulation anti-twisting mechanism, i.e., input signals including motor speed and motor drive signals to actuating components such as the servo motor.

In an embodiment, the HCI test control device includes a control module and a display module. The control module includes a processor and the display module includes a monitor.

The control module is configured to receive the motion control parameter input by the user, send the motion control parameter to the first interface signal processing unit, receive the motion state information from the motion simulation anti-twisting mechanism, and receive the performance state information from the pod.

The display module is configured to display the motion state information and the performance state information.

In an embodiment, the motion state information includes at least one selected from the group consisting of a motion mode, angular velocity, angular acceleration, a motion period, and motion frequency, and the motion mode includes a uniform motion, a triangular motion, a forward motion, and a random motion.

In an embodiment, the connector is a knotted cable.

In a second aspect, the disclosure provides the pod performance test method for the near space aerostat, applied to the pod performance test system for the near space aerostat including the HCI test control device, the motion simulation control device, the suspension device and the motion simulation anti-twisting mechanism, and the pod performance test method includes following steps.

The HCI test control device receives the motion control parameter and the performance test parameter input by the user.

The HCI test control device sends the motion control parameter to the motion simulation control device, and the performance test parameter to the pod;

The motion simulation control device controls the motion simulation anti-twisting mechanism to rotate based on the motion control parameter.

The HCI test control device receives the motion state information from the motion simulation anti-twisting mechanism.

The HCI test control device receives the performance state information from the pod.

The HCI test control device displays the motion state information and the performance state information.

In an embodiment, the step that the motion simulation control device controls the motion simulation anti-twisting mechanism to rotate based on the motion control parameter includes following steps.

The motion simulation control device generates a motion control signal based on the motion control parameter.

The motion simulation control device sends the motion control signal to the motion simulation anti-twisting mechanism, and controls the motion simulation anti-twisting mechanism to rotate.

In an embodiment, the motion state information includes the at least one selected from the group consisting of the motion mode, the angular velocity, the angular acceleration, the motion period, and the motion frequency, and the motion mode includes the uniform motion, the triangular motion, the forward motion, and the random motion.

In a third aspect, the disclosure provides a pod performance test apparatus, applied to the pod performance test system including the HCI test control device, the motion simulation control device, the suspension device, and the motion simulation anti-twisting mechanism, and the pod performance test apparatus includes a first control module, a first sending module, a second control module, a first receiving module, a second receiving module and a displaying module.

The first control module is used for the HCI test control device to receive the motion control parameter and the performance test parameter.

The first sending module is used for the HCI test control device to send the motion control parameter to the motion simulation control device and the performance test parameter to the pod.

The second control module is used for the motion simulation control device to control the motion simulation anti-twisting mechanism to rotate based on the motion control parameter.

The first receiving module is used for the HCI test control device to receive the motion state information from the motion simulation anti-twisting mechanism.

The second receiving module is used for the HCI test control device to receive the performance state information from the pod.

The displaying module is used for the HCI test control device to display the motion state information and the performance state information.

In an embodiment, the second control module is specifically used for the motion simulation control device to generate the motion control signal, send the motion control signal to the motion simulation anti-twisting mechanism, and control the motion simulation anti-twisting mechanism to rotate.

In an embodiment, the motion state information includes the at least one selected from the group consisting of the motion mode, the angular velocity, the angular acceleration, the motion period, and the motion frequency, and the motion mode includes the uniform motion, the triangular motion, the forward motion, and the random motion.

In a fourth aspect, the disclosure further provides an electronic device, including a memory, a processor and a computer program stored in the memory and capable of running on the processor. When the processor executes the computer program, any step of the pod performance test method for the near space aerostat is implemented.

In a fifth aspect, the disclosure further provides a non-transitory computer-readable storage medium on which the computer program is stored. When the computer program is executed by a processor, any step of the pod performance test method for the near space aerostat is implemented.

In a sixth aspect, the disclosure further provides a computer program product, including the computer program, when the computer program is executed by a processor, any step of the pod performance test method for the near space aerostat is implemented.

The disclosure provides the pod performance test system and method for the near space aerostat. The pod performance test system includes: the HCI test control device, the motion simulation control device, the suspension device, and the motion simulation anti-twisting mechanism. The suspension device is configured to mount the motion simulation anti-twisting mechanism. The HCI test control device is electronically connected to the motion simulation control device, the motion simulation anti-twisting mechanism and the pod of the near space aerostat separately, and the HCI test control device is configured to receive the motion control parameter input by the user, send the motion control parameter to the motion simulation control device, send the performance test parameter to the pod, receive the motion state information from the motion simulation anti-twisting mechanism, receive the performance state information from the pod, and display the motion state information and the performance state information. The motion simulation control device is electronically connected to the motion simulation anti-twisting mechanism, configured to receive the motion control parameter from the HCI test control device, and to perform the motion control to the motion simulation anti-twisting mechanism based on the motion control parameter. The motion simulation anti-twisting mechanism is connected to the pod by the connector, configured to drive the pod to move under control of the motion simulation control device. Based on the motion control parameter sent from the HCI test control device in the disclosure, the motion simulation control device can control the motion simulation anti-twisting mechanism to simulate various complex motion states of the near space aerostat, and thus the pod is in the various complex motion states. When the pod is in the various complex motion states, performance test results of the pod under the various complex motion states can be obtained. The performance test range of the pod is expanded.

BRIEF DESCRIPTION OF DRAWINGS

In order to provide a clearer description of technical solutions in the disclosure or in the related art, a brief introduction will be given below to accompanying drawings in embodiments or related art descriptions. It is apparent that the accompanying drawings in the following description are some embodiments of the disclosure. For those skilled in the art, other accompanying drawings can be obtained based on these drawings without creative labor.

FIG. 6 illustrates a first schematic flowchart of a pod performance test method for a near space aerostat of the disclosure.

Figure 1:
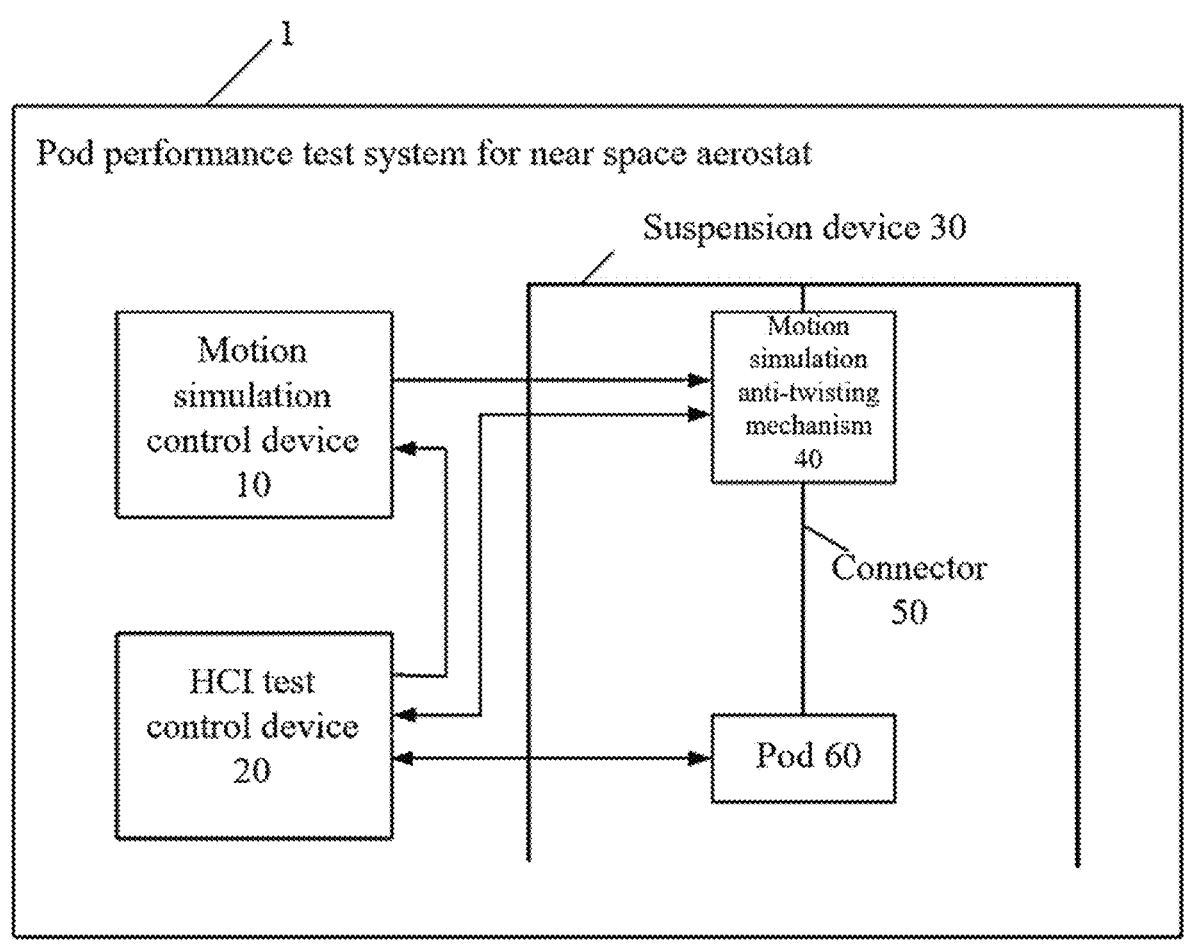
FIG. 1 illustrates a schematic diagram of a pod performance test system for a near space aerostat of the disclosure.

Description of reference numerals: 1: pod performance test system for near space aerostat; 10: motion simulation control device; 20: HCI test control device; 30: suspension device; 40: motion simulation anti-twisting mechanism; 101: power supply; 102: power board; 103: transformer; 104: voltage regulator; 105: anti-twisting controller; 106: power interface; 107: first interface signal processing unit; 108: second interface signal processing unit; 201: control module; 202: display module; 301: gantry structure; 3011: middle beam part; 3012: side beam part; 3013: bottom support; 3014: first through hole; 401: long shaft sleeve; 402: flange support; 403: pin shaft; 404: bearing; 405: bearing base; 406: motor base; 407: servo motor; 408: box body; 409: eyebolt; 4021: top ring; 4022: bottom ring; 4024: second through hole; 4025: third through hole; 410: screw;

411: screw; 412: screw; 50: connecter; 60: pod; 800: electronic device; 810: processor; 820: communication interface; 830: memory; 840: communication bus.

DETAILED DESCRIPTION OF EMBODIMENTS

In order to clarify purposes, technical solutions, and advantages of the disclosure, a clear and complete description of the technical solutions in conjunction with the accompanying drawings is provided below. Apparently, the described embodiments are a part of the embodiments of the disclosure, not all of the embodiments. Based on the embodiments in the disclosure, all other embodiments obtained by those skilled in the art without creative labor fall within the scope of protection of the disclosure.

A pod performance test system 1 for a near space aerostat is described below combined with FIG. 1. to FIG. 5.

FIG. 1 illustrates a schematic diagram of the pod performance test system 1 for the near space aerostat of the disclosure, as shown in FIG. 1, the pod performance test system 1 includes: a HCI test control device 20, a motion simulation control device 10, a suspension device 30, and a motion simulation anti-twisting mechanism 40.

The suspension device 30 is configured to mount the motion simulation anti-twisting mechanism 40.

The HCI test control device 20 is configured to receive a motion control parameter input by a user, and the HCI test control device 20 is electronically connected to the motion simulation control device 10, configured to send the motion control parameter to the motion simulation control device 10, and enable the motion simulation control device 10 to receive the motion control parameter.

The HCI test control device 20 is electronically connected to the motion simulation anti-twisting mechanism 40, configured to receive and display motion state information from the motion simulation anti-twisting mechanism 40.

The motion simulation control device 10 is electronically connected to the motion simulation anti-twisting mechanism 40, configured to perform motion control to the motion simulation anti-twisting mechanism 40 based on the motion control parameter.

The motion simulation anti-twisting mechanism 40 is connected to a pod 60 of the near space aerostat by a connector 50, configured to drive the pod 60 to move under control of the motion simulation control device 10.

It should be noted that, the pod 60 is a pod to be tested. When using the pod performance test system for the near space aerostat to test performance of the pod 60, a lower end of the motion simulation anti-twisting mechanism 40 is connected to the connector 50. An end of the connector 50 is connected to the lower end of the motion simulation anti-twisting mechanism 40, and another end of the connector 50 is connected to the pod 60. Therefore, when the motion simulation control device 10 controls the motion simulation anti-twisting mechanism 40 to rotate, the motion simulation anti-twisting mechanism 40 can drive the pod 60 to move under effect of the connector 50.

In some embodiments, the connector 50 is a knotted cable (also referred to as knotted rope).

After the motion simulation anti-twisting mechanism 40 is connected to the pod 60 by the connector 50, the HCI test control device 20 is electronically connected to the pod 60 to send a performance test parameter to the pod 60, and to receive and display performance state information from the pod 60.

The disclosure provides the pod performance test system 1 for the near space aerostat, including the HCI test control device 20, the motion simulation control device 10, the suspension device 30, and the motion simulation anti-twisting mechanism 40. The suspension device 30 is configured to mount the motion simulation anti-twisting mechanism 40. The HCI test control device 20 is electronically connected to the motion simulation control device 10, the motion simulation anti-twisting mechanism 40 and the pod 60 of the near space aerostat separately, and the HCI test control device 20 is configured to receive the motion control parameter input by the user, send the motion control parameter to the motion simulation control device 10, send the performance test parameter to the pod 60, receive the motion state information from the motion simulation anti-twisting mechanism 40, receive the performance state information from the pod 60, and display the motion state information and the performance state information. The motion simulation control device 10 is electronically connected to the motion simulation anti-twisting mechanism 40, configured to receive the motion control parameter from the HCI test control device 20, and to perform the motion control to the motion simulation anti-twisting mechanism 40 based on the motion control parameter. The motion simulation anti-twisting mechanism 40 is connected to the pod 60 by the connector 50, configured to drive the pod 60 to move under control of the motion simulation control device 10. Based on the motion control parameter sent from the HCI test control device 20 in the disclosure, the motion simulation control device 10 can control the motion simulation anti-twisting mechanism 40 to simulate various complex motion states of the near space aerostat, and thus the pod 60 is in the various complex motion states. When the pod 60 is in the various complex motion states, performance test results of the pod 60 under the various complex motion states can be obtained. The performance test range of the pod is expanded.

Figure 2:
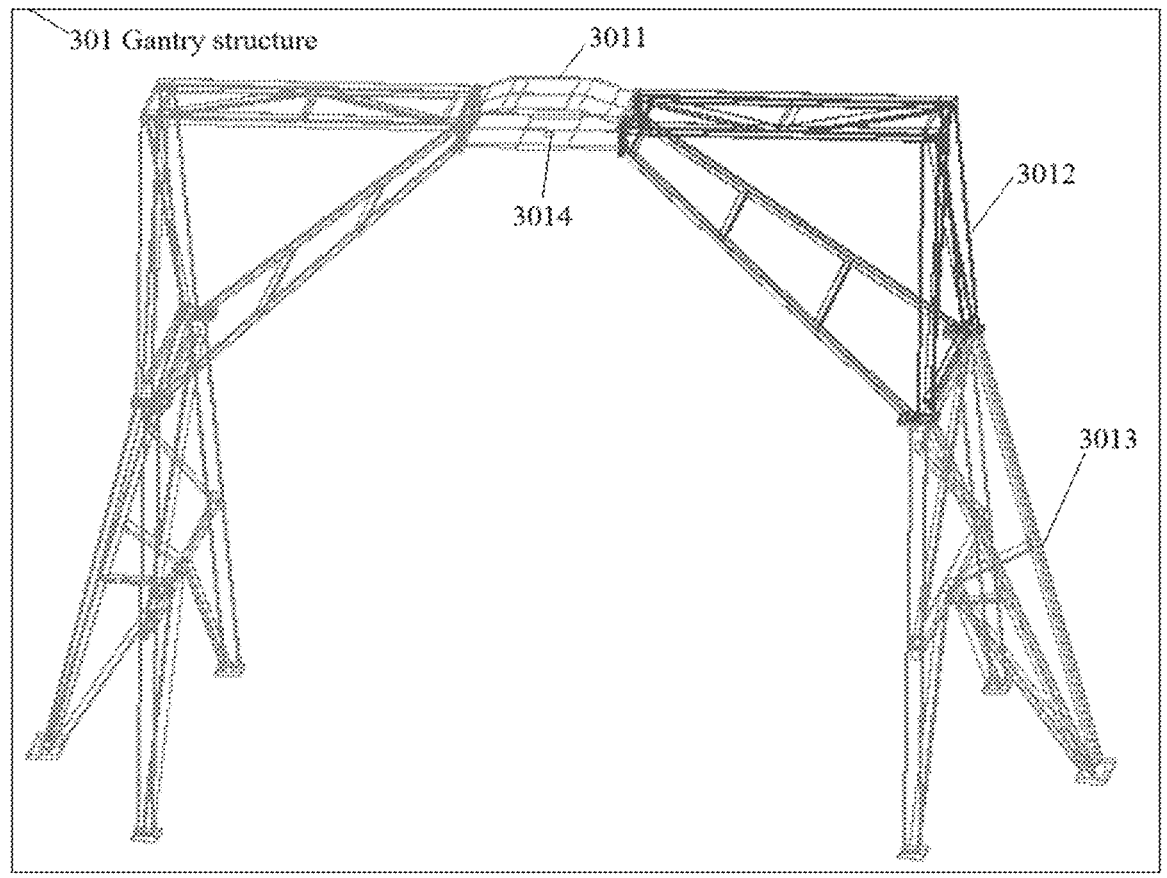
FIG. 2 illustrates a schematic diagram of a suspension device according to an embodiment of the disclosure.
Figure 3:
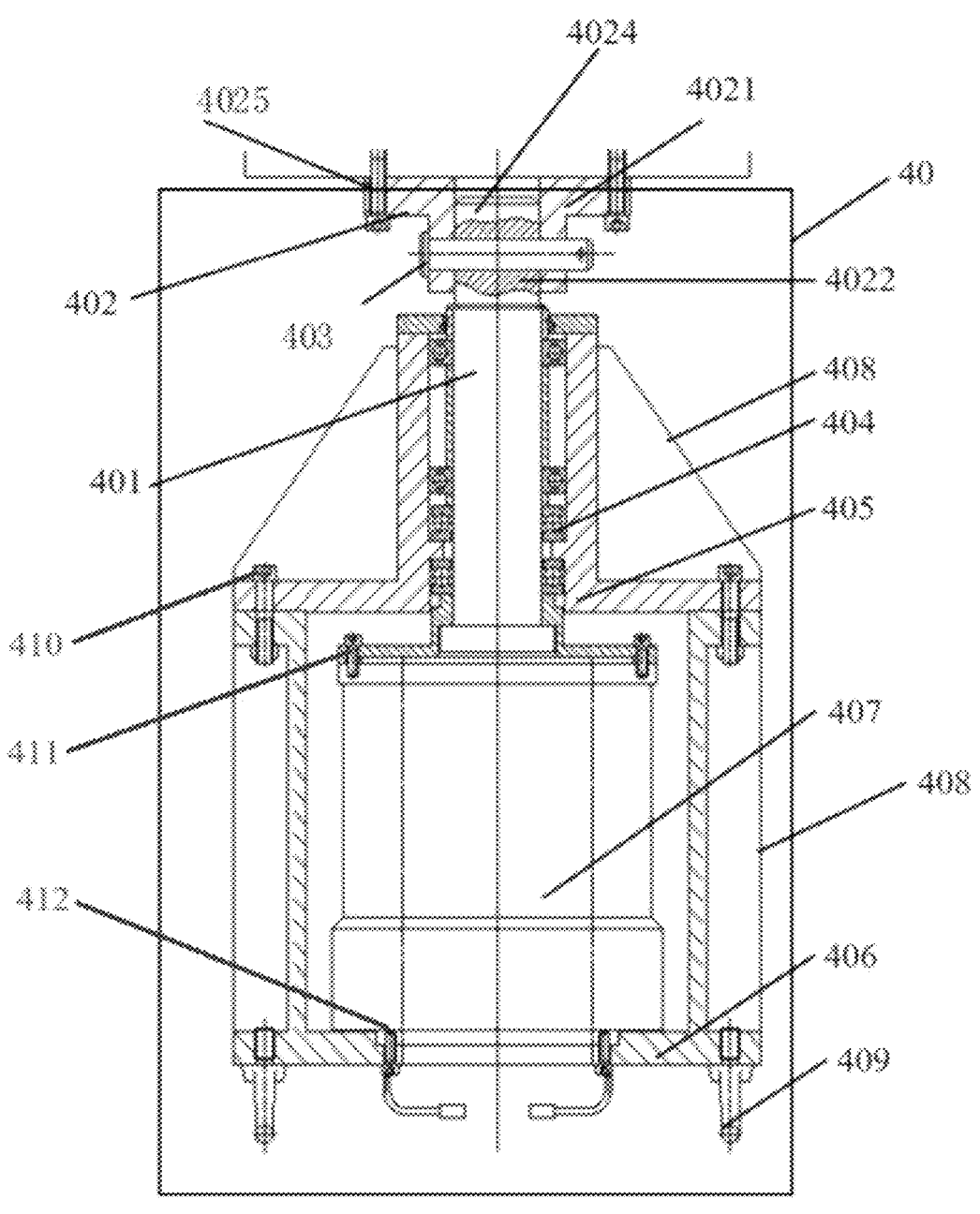
FIG. 3 illustrates a schematic diagram of a motion simulation anti-twisting mechanism according to the embodiment of the disclosure.
Figure 4:
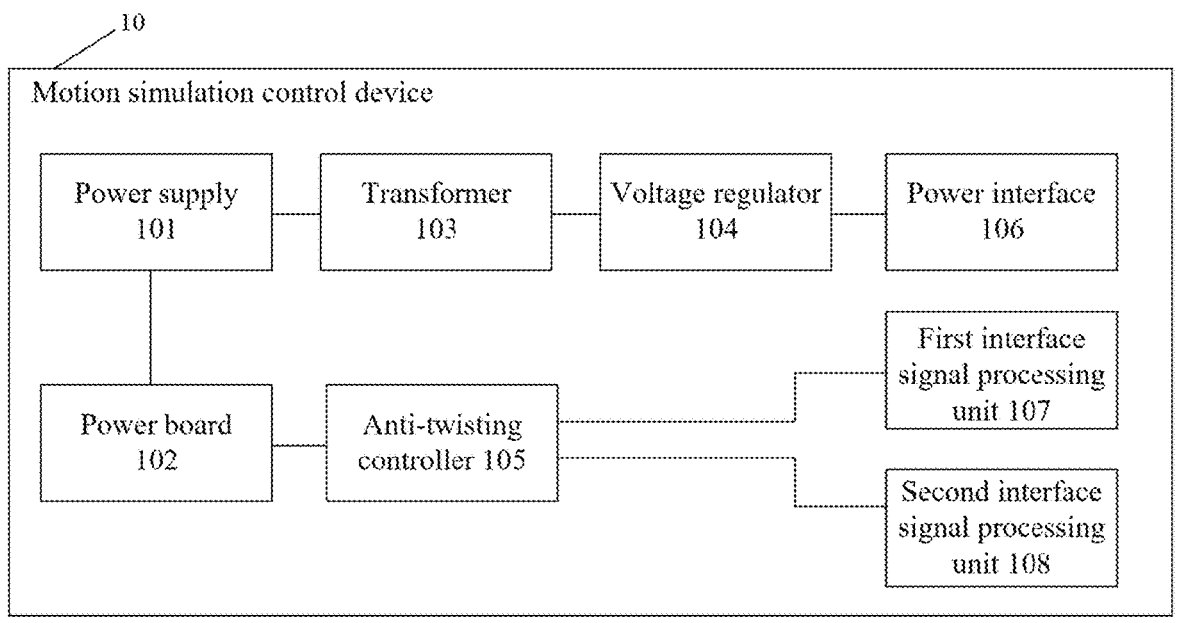
FIG. 4 illustrates a schematic diagram of a motion simulation control device according to the embodiment of the disclosure.

Based on above embodiment, the pod performance test system 1 for the near space aerostat of the disclosure is further described below in conjunction with a specific embodiment and FIG. 2 to FIG. 5. FIG. 2 illustrates a schematic diagram of the suspension device 30 according to the embodiment of the disclosure. FIG. 3 illustrates a schematic diagram of the motion simulation anti-twisting mechanism 40 according to the embodiment of the disclosure. FIG. 4 illustrates a schematic diagram of the motion simulation control device 10 according to the embodiment of the disclosure. FIG. 5 illustrates a schematic diagram of the HCI test control device 20 according to the embodiment of the disclosure.

As shown in FIG. 2, the suspension device 30 adopts a gantry structure 301. The gantry structure 301 includes three parts: a middle beam part 3011, side beam parts 3012 and bottom supports 3013 (also referred to as bracing), and each of the side beam parts 3012 and the bottom supports 3013 is a trapezoid structure. The middle beam part 3011 includes multiple middle beams (also referred to as intermediate beams). Each side beam part 3012 includes multiple side beams (also referred to as uprights)

A bottom of the middle beam part 3011 defines at least one first through hole 3014, configured to mount the motion simulation anti-twisting mechanism 40.

As shown in FIG. 3, the motion simulation anti-twisting mechanism 40 includes a long shaft sleeve 401, a flange support 402, a pin shaft 405, a bearing 404, a bearing base 405, a motor base 406, a servo motor 407, a box body 408, and eyebolts 409.

The flange support 402 includes a top ring 4021 and a bottom ring 4022, the top ring 4021 and the bottom ring 4022 together define a second through hole 4024, a first end of the long shaft sleeve 401 is disposed in the second through hole 4024, the top ring 4021 defines multiple third through holes 4025, bolts pass through the first through holes 3014 and the third through holes 4025 to be matched with nuts, to fix the gantry structure 301 to the flange support 402.

The pin shaft 403 passes through the bottom ring 4022 and the long shaft sleeve 401.

An outside of a second end of the long shaft sleeve 401 is sleeved with the bearing 404, and an outside of the bearing 404 is sleeved with the bearing base 405.

The second end of the long shaft sleeve 401 is connected to the servo motor 407 by screws 411.

The motor base 406 is disposed at a lower end of the servo motor 407, and an upper end of the motor base 406 is connected to the bearing base 405 by screws 410.

The box body 408 is disposed outside the bearing base 405 and the motor base 406, and a lower end of the box body 408 is fixed on the motor base 406 by screws 412.

The eyebolts 409 are fixed on the motor base 406 to connect the connector 50.

As shown in FIG. 4, the motion simulation control device 10 includes a power supply 101, a power board 102, a transformer 103, a voltage regulator 104 (also referred to as voltage stabilizer), an anti-twisting controller 105, a power interface 106, a first interface signal processing unit 107, and a second interface signal processing unit 108.

The power supply 101 is connected to the transformer 103 and the power board 102 separately, the transformer 103 is connected sequentially to the voltage regulator 104 and the power interface 106, the power board 102 is connected to the anti-twisting controller 105, and the anti-twisting controller 105 is connected to the first interface signal processing unit 107 and the second interface signal processing unit 108 separately.

The power interface 106 is electronically connected to the motion simulation anti-twisting mechanism 40 by a cable, in order that the motion simulation control device 10 can supply power to the motion simulation anti-twisting mechanism 40 by the power interface 106.

The first interface signal processing unit 107 is electronically connected to the HCI test control device 20 by a cable, in order that the motion simulation control device 10 can receive the motion control signal from the HCI test control device 20 by the first interface signal processing unit 107.

In some embodiments, the motion state information includes at least one selected from the group consisting of a motion mode, angular velocity, angular acceleration, a motion period, and motion frequency, and the motion mode includes a uniform motion, a triangular motion, a forward motion, and a random motion. The motion control parameter and the motion mode can be set according to specific needs without any restrictions.

Therefore, the motion simulation control device 10 may generate different motion control signals according to the motion control parameter to control the motion simulation anti-twisting mechanism 40 to move under different motion modes, angular velocity, angular acceleration, motion periods, and motion frequency.

The second interface signal processing unit 108 is electronically connected to the motion simulation anti-twisting mechanism 40 by a cable, in order that the motion simulation control device 10 can perform the motion control to the motion simulation anti-twisting mechanism 40 by the second interface signal processing unit 108.

Figure 5:
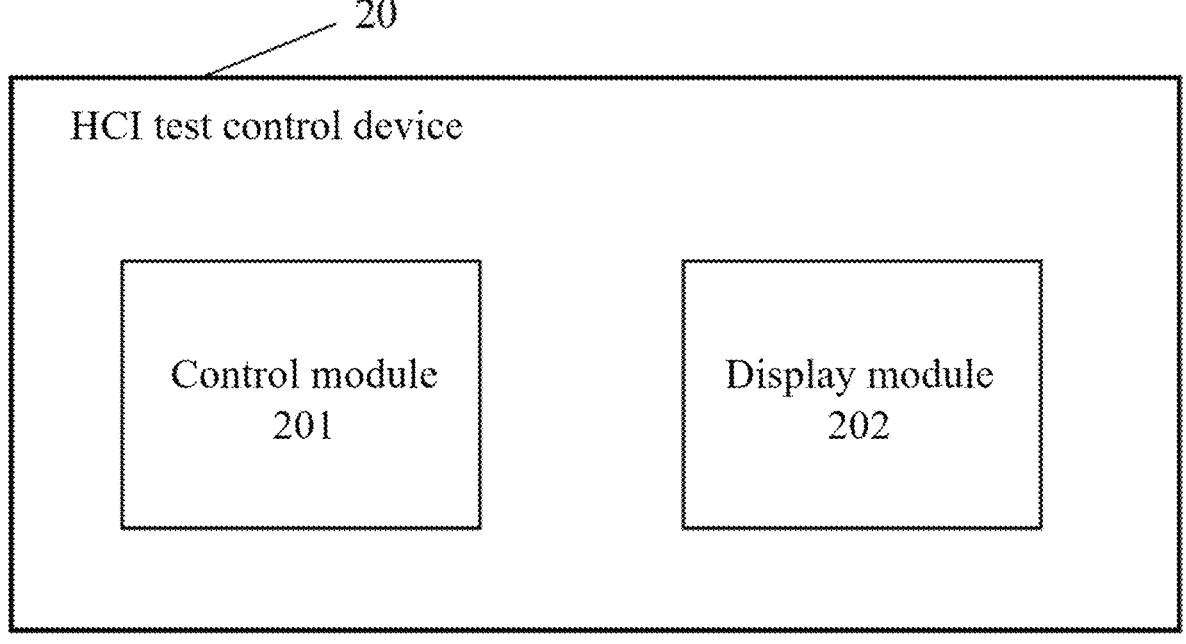
FIG. 5 illustrates a schematic diagram of a HCI test control device according to the embodiment of the disclosure.

As shown in FIG. 5, the HCI test control device 20 includes a control module 201 and a display module 202.

The control module 201 is configured to receive the motion control parameter input by the user, send the motion control parameter to the first interface signal processing unit 107, receive the motion state information from the motion simulation anti-twisting mechanism 40, and the performance state information from the pod 60.

The display module 202 is configured to display the performance state information of the pod 60 when the motion simulation anti-twisting mechanism 40 is in motion under the motion state information.

The disclosure provides the pod performance test system 1 for the near space aerostat, the motion simulation anti-twisting mechanism 40 sends the motion state information to the HCI test control device 20, and the HCI test control device 20 obtain an actual motion state of the motion simulation anti-twisting mechanism 40 rather than a motion state corresponding to the motion control parameter. The motion control parameter and the performance test parameter are input into the pod performance test system 1 for the near space aerostat to obtain the performance state information, and a motion state corresponding to the performance state information is determined as the motion state information, which improves accuracy of the performance test.

A pod performance test method for the near space aerostat is described below in conjunction with FIG. 6 and FIG. 7.

FIG. 6 illustrates a first schematic flowchart of the pod performance test method for the near space aerostat of the disclosure. As shown in FIG. 6, the pod performance test method includes following steps.

Step 610, the HCI test control device 20 receives the motion control parameter and the performance test parameter input by the user.

It should be noted that when performing the pod performance test, the user should input the motion control parameter and the performance test parameter into the HCI test control device 20. The motion control parameter is used for the motion simulation control device 10 to control the motion simulation anti-twisting mechanism 40 to rotate based on the motion control parameter.

The performance test parameter is a test parameter corresponding to performance of the pod 60 to be tested.

Step 620, the HCI test control device 20 sends the motion control parameter to the motion simulation control device 10 and sends the performance test parameter to the pod 60.

In some embodiments, the HCI test control device 20 sends the motion control parameter to the first interface signal processing unit 107 of the motion simulation control device 10 and sends the performance test parameter to the pod 60.

Step 630, the motion simulation control device 10 controls the motion simulation anti-twisting mechanism 40 to rotate according to the motion control parameter.

Based on the step 620, the motion simulation control device 10 receives the motion control parameter from the HCI test control device 20 by the first interface signal processing unit 107, and then the motion simulation control device 10 controls the motion simulation anti-twisting mechanism 40 to rotate according to the motion control parameter.

Figure 7:
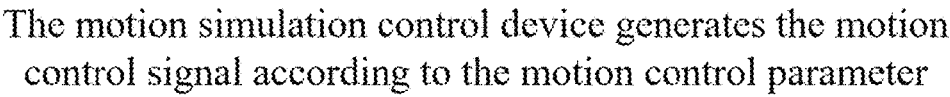
FIG. 7 illustrates a second schematic flowchart of the pod performance test method for the near space aerostat of the disclosure.

In some embodiments, FIG. 7 illustrates a second schematic flowchart of the pod performance test method for the near space aerostat of the disclosure. As shown in FIG. 7, the step 630 may include step 710 to step 720 below.

Step 710, the motion simulation control device 10 generates the motion control signal according to the motion control parameter.

In some embodiments, the motion state information includes the at least one selected from the group consisting of the motion mode, the angular velocity, the angular acceleration, the motion period, and the motion frequency, and the motion mode includes the uniform motion, the triangular motion, the forward motion, and the random motion. Therefore, the motion simulation control device 10 may generate different motion control signals according to the motion control parameter to control the motion simulation anti-twisting mechanism 40 to move under different motion modes, angular velocity, angular acceleration, motion periods, and motion frequency.

Step 720, the motion simulation control device 10 sends the motion control signal to the motion simulation anti-twisting mechanism 40 to control the motion simulation anti-twisting mechanism 40 to rotate.

In some embodiments, the motion simulation control device 10 sends the motion control signal to the motion simulation anti-twisting mechanism 40 by the second interface signal processing unit 108, making the motion simulation anti-twisting mechanism 40 rotate when receiving the motion control signal.

Step 640, the HCI test control device 20 receives the motion state information from the motion simulation anti-twisting mechanism 40.

It should be noted that, the motion simulation control device 10 controls the motion simulation anti-twisting mechanism 40 based on the motion control parameter. Due to various reasons or interferences, the actual motion state of the motion simulation anti-twisting mechanism 40 is inconsistent with the motion state corresponding to the motion control parameter. Therefore, to obtain the actual motion state, the motion simulation anti-twisting mechanism 40 sends the motion state information to the HCI test control device 20.

Step 650, the HCI test control device 20 receives the performance state information from the pod 60.

Based on the step 620, after the HCI test control device 20 sends the performance test parameter to the pod 60, the pod 60 performs the performance test according to the performance test parameter to obtain the performance state information. After the performance test, the pod 60 sends the performance state information to the HCI test control device 20.

The HCI test control device 20 receives the performance state information from the pod 60.

Step 660, the HCI test control device 20 displays the motion state information and the performance state information.

Based on above step, the HCI test control device 20 receives the motion state information and the performance state information, and displays the perform test results (e.g., the motion state information and the performance state information) by the display module 202.

In some embodiments, the display module 202 displays the motion state information and the performance state information.

The disclosure provides the pod performance test method for the near space aerostat, the HCI test control device 20 receives the motion control parameter and the performance test parameter input by the user, sends the motion control parameter to the motion simulation control device 10 and sends the performance test parameter to the pod 60. The motion simulation control device 10 controls the motion simulation anti-twisting mechanism 40 to rotate according to the motion control parameter. The HCI test control device 20 receives the performance state information from the pod 60 and the motion state information from the motion simulation anti-twisting mechanism 40. The HCI test control device 20 displays the motion state information and the performance state information. In the disclosure, based on the motion control parameter sent by the HCI test control device 20, the motion simulation control device 10 can control the motion simulation anti-twisting mechanism 40 to simulate various complex motion states of the near space aerostat, and thus the pod 60 is in the various complex motion states. When the pod 60 is in the various complex motion states, performance test results of the pod 60 under the various complex motion states can be obtained. The performance test range of the pod is expanded.

The disclosure further provides an electronic device 800, including a processor 810, a memory 830 and a computer program or instructions stored in the memory and capable of running on the processor. When the processor executes the computer program or the instructions, any step of the pod performance test method for the near space aerostat is implemented and technical effects same as that of the pod performance test method are achieved. To avoid repetition, the computer program or the instructions are not repeated here.

Figure 8:
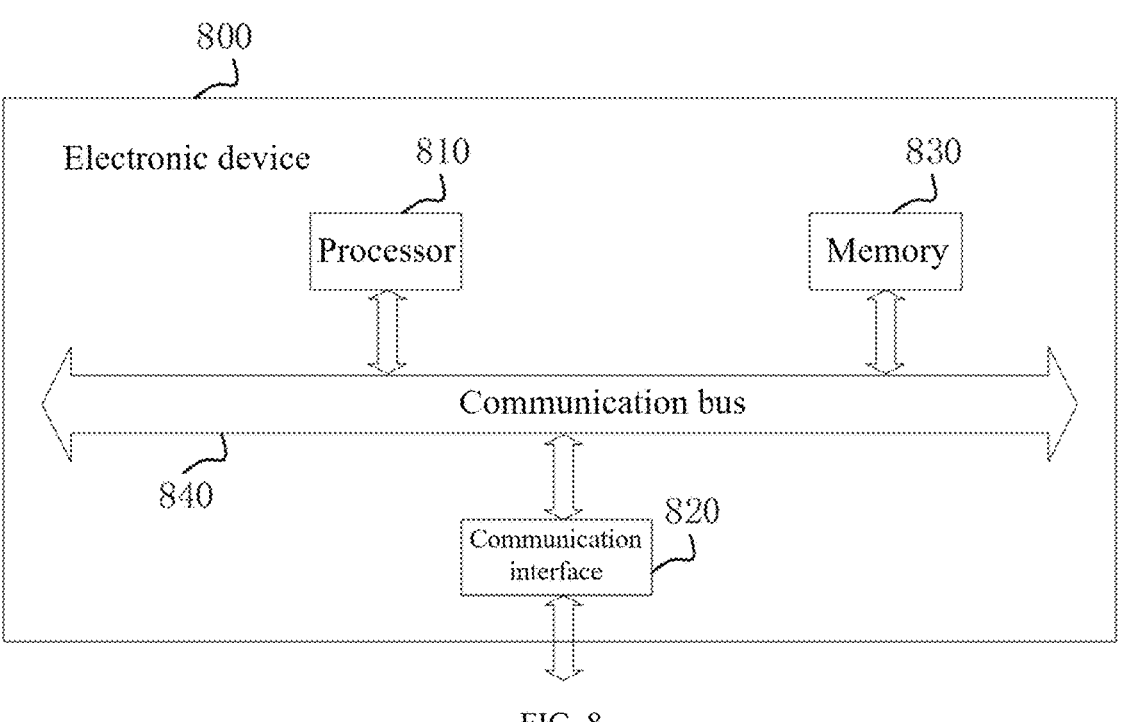
FIG. 8 illustrates a schematic diagram of a physical structure of an electronic device of the disclosure.

FIG. 8 illustrates a schematic diagram of a physical structure of the electronic device of the disclosure. As shown in FIG. 8, the electronic device 800 including the processor 810, a communication interface 820, the memory 830 and a communication bus 840. The processor 810, the communication interface 820, and the memory 830 communicate with each other via the communication bus 840. The processor 810 may call logical instructions in the memory 830 to execute the pod performance test method for the near space aerostat. The pod performance test method includes the following steps: the HCI test control device 20 receives the motion control parameter and the performance test parameter input by the user, sends the motion control parameter to the motion simulation control device 10 and sends the performance test parameter to the pod 60. The motion simulation control device 10 controls the motion simulation anti-twisting mechanism 40 to rotate according to the motion control parameter. The HCI test control device 20 receives the performance state information from the pod 60 and the motion state information from the motion simulation anti-twisting mechanism 40. The HCI test control device 20 displays the motion state information and the performance state information.

In addition, the logical instructions in the memory 830 can be implemented in a form of a software functional unit and stored in a computer-readable storage medium when sold or used as an independent product. Based on this understanding, the technical solutions of the disclosure, or a portion that contributes to the related art, or a portion of the technical solutions, can be manifested in a form of a software product, the software product is stored in a storage medium and includes several instructions to enable a computer device (which can be a personal computer, server, or network device, etc.) to perform all or part of the steps of the pod performance test method described in the embodiments of the disclosure. The storage medium includes: a flash drive, a portable hard drive, a read-only memory (ROM), a random-access memory (RAM), a disk or a compact disc (CD), and other media that can store program code.

In addition, the disclosure further provides a computer program product, the computer program product includes a computer program. The computer program may be stored in a non-transitory computer-readable storage medium. When the computer program is executed by a processor, the computer device implements the pod performance test method for the near space aerostat. The pod performance test method includes the following steps: the HCI test control device 20 receives the motion control parameter and the performance test parameter input by the user, sends the motion control parameter to the motion simulation control device 10 and sends the performance test parameter to the pod 60. The motion simulation control device 10 controls the motion simulation anti-twisting mechanism 40 to rotate according to the motion control parameter. The HCI test control device 20 receives the performance state information from the pod 60 and the motion state information from the motion simulation anti-twisting mechanism 40. The HCI test control device 20 displays the motion state information and the performance state information.

In addition, the disclosure further provides a non-transitory computer-readable storage medium with the computer program stored thereon. When the computer program is executed by a processor, the pod performance test method for the near space aerostat is implemented. The pod performance test method includes the following steps: the HCI test control device 20 receives the motion control parameter and the performance test parameter input by the user, sends the motion control parameter to the motion simulation control device 10 and sends the performance test parameter to the pod 60. The motion simulation control device 10 controls the motion simulation anti-twisting mechanism 40 to rotate according to the motion control parameter. The HCI test control device 20 receives the performance state information from the pod 60 and the motion state information from the motion simulation anti-twisting mechanism 40. The HCI test control device 20 displays the motion state information and the performance state information.

Above embodiments described are only schematic, where units described as separate components may or may not be physically separated, and components displayed as units may or may not be physical units, i.e., the components can be located in one place or distributed across multiple network units. Some or all modules can be selected according to actual needs to achieve the purpose of the embodiment. Those skilled in the art can understand and implement it without creative labor.

Through the description of the above embodiments, those skilled in the art can clearly understand that each embodiment can be achieved through software and necessary general hardware platforms, and of course, it can also be achieved through hardware. Based on this understanding, the technical solutions or the parts that contribute to the related art can be reflected in the form of software products, which can be stored in computer-readable storage media such as ROM/RAM, disks, CD, etc., including several instructions to enable the computer device (which can be a personal computer, server, or network device, etc.) to execute methods described in various embodiments or certain parts of the embodiments.

Finally, it should be noted that the above embodiments are only used to illustrate the technical solutions of the disclosure, and not to limit it. Although the disclosure has been described in detail with reference to the embodiments, those skilled in the art should understand that it is still possible to modify the technical solutions recorded in the embodiments, or to equivalently replace some of the technical features therein. And these modifications or replacements do not make the essence of the corresponding technical solutions depart from the spirit and scope of the technical solutions of the embodiments of the disclosure.

What is claimed is:

1. A pod performance test system for a near space aerostat, comprising:

a human-computer interaction (HCI) test control device, a motion simulation control device, a suspension device, and a motion simulation anti-twisting mechanism;

wherein the suspension device is configured to mount the motion simulation anti-twisting mechanism;

wherein the HCI test control device is electronically connected to the motion simulation control device, the motion simulation anti-twisting mechanism and a pod of the near space aerostat separately, and the HCI test control device is configured to receive a motion control parameter input by a user, send the motion control parameter to the motion simulation control device, send a performance test parameter to the pod, receive motion state information from the motion simulation anti-twisting mechanism, receive performance state information from the pod, and display the motion state information and the performance state information;

wherein the motion simulation control device is electronically connected to the motion simulation anti-twisting mechanism, configured to receive the motion control parameter from the HCI test control device, and to perform motion control to the motion simulation anti-twisting mechanism based on the motion control parameter; and wherein the motion simulation anti-twisting mechanism is connected to the pod by a connector, configured to drive the pod to move under control of the motion simulation control device.

2. The pod performance test system for the near space aerostat as claimed in claim 1, wherein the suspension device adopts a gantry structure, and the gantry structure comprises three parts: a middle beam part, side beam parts and bottom supports; wherein each of the side beam parts and the bottom supports is a trapezoid structure, and a bottom of the middle beam part defines at least one first through hole, configured to mount the motion simulation anti-twisting mechanism.

3. The pod performance test system for the near space aerostat as claimed in claim 2, wherein the motion simulation anti-twisting mechanism comprises a shaft sleeve, a flange support, a pin shaft, a bearing, a bearing base, a motor base, a servo motor, a box body, and eyebolts, the flange support comprises a top ring and a bottom ring, the top ring and the bottom ring together define a second through hole with an axis same as axes of the top ring and the bottom ring, a first end of the shaft sleeve is disposed in the second through hole, the top ring defines a plurality of third through holes, the at least one first through hole is multiple, bolts pass through the multiple first through holes and the plurality of third through holes to be matched with nuts, to fix the gantry structure to the flange support, the pin shaft passes through the bottom ring and the shaft sleeve, an outside of a second end of the shaft sleeve is sleeved with the bearing, an outside of the bearing is sleeved with the bearing base, the second end of the shaft sleeve is connected to the servo motor by screws, the motor base is disposed at a lower end of the servo motor, an upper end of the motor base is connected to the bearing base by screws, and the box body is disposed outside the bearing base and the motor base, a lower end of the box body is fixed on the motor base by screws.

4. The pod performance test system for the near space aerostat as claimed in claim 3, wherein the motion simulation control device comprises a power supply, a power board, a transformer, a voltage regulator, an anti-twisting controller, a power interface, a first interface signal processing unit, and a second interface signal processing unit;

wherein the power supply is connected to the transformer and the power board separately, the transformer is connected sequentially to the voltage regulator and the power interface, the power board is connected to the anti-twisting controller, and the anti-twisting controller is connected to the first interface signal processing unit and the second interface signal processing unit separately;

wherein the power interface is electronically connected to the motion simulation anti-twisting mechanism by a cable, configured to supply power to the motion simulation anti-twisting mechanism;

wherein the first interface signal processing unit is electronically connected to the HCI test control device by a cable, configured to receive the motion control parameter from the HCI test control device; and wherein the second interface signal processing unit is electronically connected to the motion simulation anti-twisting mechanism by a cable, configured to perform the motion control to the motion simulation anti-twisting mechanism.

5. The pod performance test system for the near space aerostat as claimed in claim 4, wherein the HCI test control device comprises a control module and a display module;

wherein the control module is configured to receive the motion control parameter input by the user, send the motion control parameter to the first interface signal processing unit, receive the motion state information from the motion simulation anti-twisting mechanism, and receive the performance state information from the pod;

wherein the display module is configured to display the motion state information and the performance state information.

6. The pod performance test system for the near space aerostat as claimed in claim 1, wherein the motion state information comprises at least one selected from the group consisting of a motion mode, angular velocity, angular acceleration, a motion period, and motion frequency; wherein the motion mode comprises a uniform motion, a triangular motion, a forward motion, and a random motion.

7. The pod performance test system for the near space aerostat as claimed in claim 1, wherein the connector is a knotted cable.

8. A pod performance test method for a near space aerostat, applied to a pod performance test system for the near space aerostat comprising a HCI test control device, a motion simulation control device, a suspension device and a motion simulation anti-twisting mechanism, the pod performance test method comprising:

receiving, by the HCI test control device, a motion control parameter and a performance test parameter input by a user;

sending, by the HCI test control device, the motion control parameter to the motion simulation control device, and the performance test parameter to a pod of the near space aerostat;

controlling, by the motion simulation control device, the motion simulation anti-twisting mechanism to rotate based on the motion control parameter;

receiving, by the HCI test control device, motion state information from the motion simulation anti-twisting mechanism;

receiving, by the HCI test control device, performance state information from the pod; and displaying, by the HCI test control device, the motion state information and the performance state information.

9. The pod performance test method for the near space aerostat as claimed in claim 8, wherein the controlling, by the motion simulation control device, the motion simulation anti-twisting mechanism to rotate based on the motion control parameter, comprises:

generating, by the motion simulation control device, a motion control signal based on the motion control parameter;

sending, by the motion simulation control device, the motion control signal to the motion simulation anti-twisting mechanism, and controlling, by the motion simulation control device, the motion simulation anti-twisting mechanism to rotate.

10. The pod performance test method for the near space aerostat as claimed in claim 8, wherein the motion state information comprises at least one selected from the group consisting of a motion mode, angular velocity, angular acceleration, a motion period, and motion frequency; wherein the motion mode comprises a uniform motion, a triangular motion, a forward motion, and a random motion.

\* \* \* \* \*